Dec. 3, 1957 E. J. HLINSKY 2,815,196
BORING TYPE MINER HAVING ADJUSTABLE UPPER AND
LOWER GUIDES FOR CUSP CUTTING MEANS
Filed Nov. 19, 1956 2 Sheets-Sheet 1

INVENTOR.
Emil J. Hlinsky
BY
Murray A. Gleeson
ATTORNEY

Dec. 3, 1957 E. J. HLINSKY 2,815,196
BORING TYPE MINER HAVING ADJUSTABLE UPPER AND
LOWER GUIDES FOR CUSP CUTTING MEANS
Filed Nov. 19, 1956 2 Sheets-Sheet 2

INVENTOR.
Emil J. Hlinsky
BY
Murray A. Gleeson
ATTORNEY

United States Patent Office 2,815,196
Patented Dec. 3, 1957

2,815,196

BORING TYPE MINER HAVING ADJUSTABLE UPPER AND LOWER GUIDES FOR CUSP CUTTING MEANS

Emil J. Hlinsky, La Grange Park, Ill., assignor to Goodman Manufacturing Company, Chicago, Ill., a corporation of Illinois Application November 19, 1956, Serial No. 622,953

2 Claims. (Cl. 262—7)

This invention relates generally to mining machines of the boring type and more particularly to an improved construction for raising and lowering the cutter bars which remove the cusps remaining from the action of the boring arms.

One of the principal objects of this invention is to provide an improved boring type miner with improved mechanism for raising and lowering the cutter bars.

Other objects and important features of the invention will be apparent from a study of the specification following taken with the drawings which together describe and illustrate a preferred embodiment of the invention and what is now considered to be the best mode of practicing the principles thereof. Other embodiments may be suggested to those having the benefit of the teachings herein and such other embodiments are intended to be reserved especially as they fall within the scope and purview of the subjoined claims.

Figure 1:
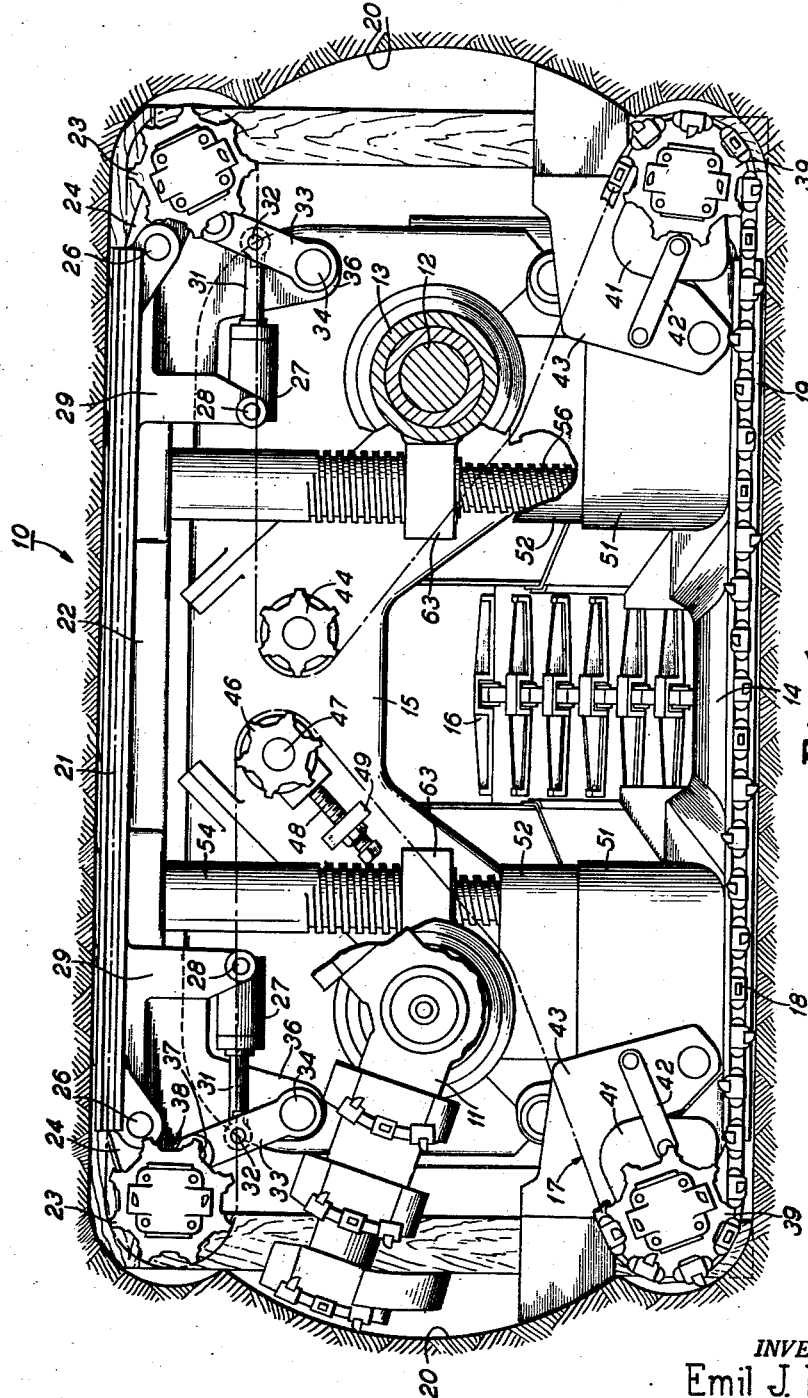
Fig. 1 is a front elevational view of a boring type miner having the improvements according to the present invention embodied therein.

Referring now particularly to Fig. 1 of the drawings there is shown a boring type miner referred to generally by the reference numeral 10. The miner 10 includes a boring head 15 which supports boring arms 11 which turn in opposite directions to cut or fragment coal or other material from the solid seam 20 thereof. The boring arms 11 are each mounted on a shaft 12 turning within a hub 13 of the boring head 15. The cuttings resulting from the operation of the boring arms 11 are delivered to a cuttings receiving throat 14 whence they are removed therefrom by means of a cuttings flight conveyor 16 which is of the endless chain type.

The operation of the boring arms results in the formation of an upper depending cusp, not shown, and a lower upstanding cusp, also not shown. These are removed by an endless chain 17 having a lower run 18 movable along a lower cutter chain guide 19, and an upper run 21 movable along an upper chain guide 22.

In order to provide a substantially rectangular shaped bore both the upper guide 22 and the lower guide 19 are provided with idler sprockets which move into position to extend the effective length of such guides, which sprockets can be retracted for removal of the machine 10 from proximity to the working face. Upper idler sprockets 23 are accordingly mounted on an arm 24 pivoted at 26 to the ends of the upper cutter guide 22. The sprocket 23 is moved to the extended position by means of a fluid operated cylinder 27 pivoted at one end as at 28 to a bracket 29 extending downward from the upper chain guide 22. The cylinder 27 has a piston rod 31 therein which is pivotally connected at 32 to a link 33. The link 33 is pivotally connected at 34 to an extension 36 from the guide 22, and the link 33 is pivotally connected at 37 to an ear 38 extending from the arm 24. It will be seen that the fluid operated cylinder 27 and its linkage connection to the arm 24 can operate to move the idler sprocket 23 to the position seen in Fig. 1.

The lower cutter guide 19 is likewise provided with an idler sprocket 39 at each end thereof. Said idler sprocket is mounted on an arm 41 and is arranged to be moved to a retracted position by means, not shown, similar to the fluid operated cylinders 27 shown with reference to the upper sprockets 23. The arm 41 is connected by a link 42 to a pusher plate 43 as may be disclosed in Lindberg et al. application Serial No. 488,528, filed February 16, 1955, for Cutter Chain Take-Up Mechanism for Variable Height Boring Type Miner, owned by the assignee of the present invention and now abandoned.

Means are provided for driving the endless chain 17, and to this end the forward face of the boring head 15 has a driving sprocket 44 extending therefrom. The amount of slack within the endless cutter chain 17 is adjusted by an idler sprocket 46 mounted on an idler shaft 47, the position of the idler shaft 47 being adjusted by a screw 48, threaded into an abutment 49 extending from the forward face of the boring head 15.

The cuttings resulting from the action of the boring arms 11 are guided by a vertically movable pusher plate 51 to each side of the throat 14. These are movable with the lower chain guide 19, and are in telescoping relation with fixed guide plates 52 secured to the front of the boring head 15.

Figure 2:
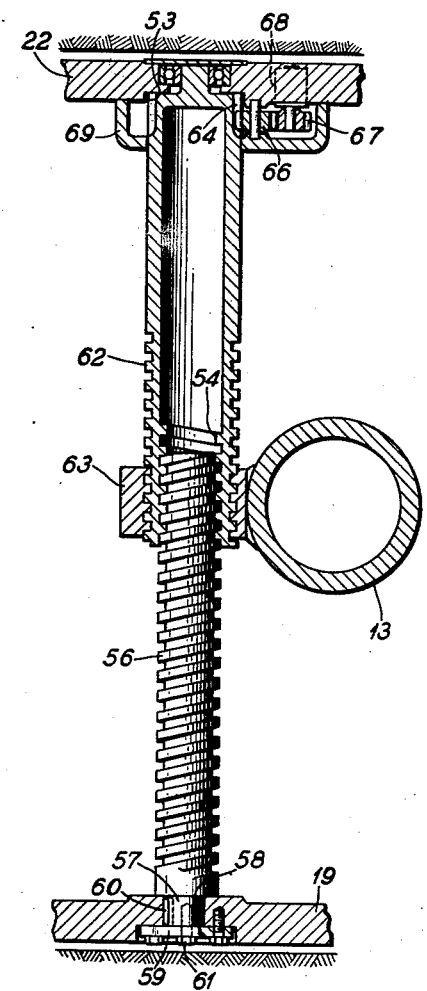
Fig. 2 is a detailed elevational view of a screw mechanism for raising and lowering the upper and lower cutter bars seen in Fig. 1.
Figure 3:
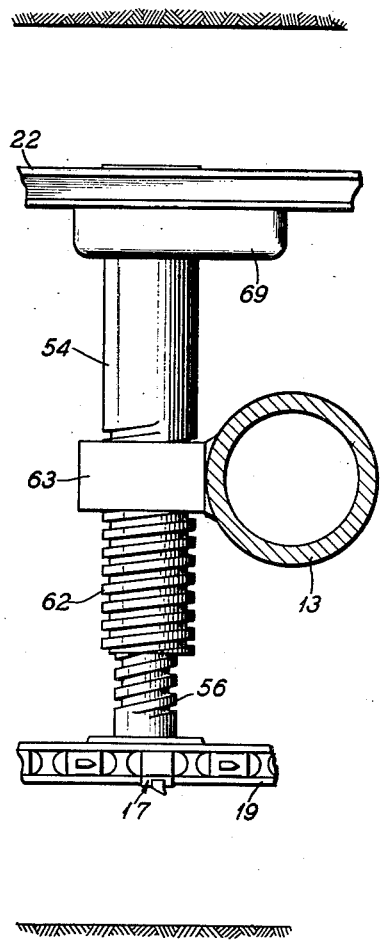
Fig. 3 is a view similar to Fig. 2 but showing the cutter bars in the retracted position.

Means are provided for raising and lowering the upper and lower cutter chain guides 22 and 19, and referring now to Figs. 2 and 3 of the drawings the upper chain guide 22 has a cylindrical recess 53 therein for a hollow internal screw member 54. The lower chain guide 19 has extending upward therefrom an external screw member 56 which terminates at the lower end thereof in a pintle 57 extending within a bore 58 in the lower chain guide 19. The external screw member 56 is held in position by a plate 59 having a cap screw 61 threaded into the end of the pintle 57; the latter is keyed, as at 60, against rotation relative to the lower cutter bar 19.

The outer surface of the internal screw member 54 is provided with screw surfaces 62 which mate with a fixed nut 63 held to the boring head 15.

Means are provided for rotating the internal screw member 54 to cause telescoping movement of the internal screw member 54 and the external screw member 56, and to this end the upper end of the internal screw member 54 is provided with gear teeth 64 which mesh with a reaching pinion 66 in turn meshing with a driving pinion 67 driven by a fluid operated motor 68. The gear train described is contained within a housing 69 located at the underside of the upper cutter bar 22.

It will be apparent that the operation of the fluid motor 68 will cause internal screw member 54 to rotate, the two members moving telescopically with respect to each other, the internal screw member 54 by reason of its threaded engagement with the nut 63 moving downward whilst the external screw member 56 moving upward. Reverse operation of the fluid operated motor 68 will move the members in the opposite directions.

The rate and extent which the upper and lower cutter bars can be drawn together is determined by the pitch of the threads 56 and 62. For example, in a boring miner which is adjustable to cut at different heights, the cutter bars should be movable at the same rate toward and away from a central horizontal plane including the axes of the drive shafts 12 in which case the pitch of the threads 56 should be twice that of the threads 62. On the other hand, for a miner which is designed to cut only a single height at its fully extended position and then to be contracted to a more compact configuration for tramming from one working place to another, it may be desirable to contract the upper cutter bar a greater amount than the lower cutter bar, to provide clearance for roof timbers set behind the miner. By way of a specific example, assume the miner is to operate in a 54-inch seam. In its contracted position, it is desired that the lower cutter bar be 6 inches above the floor and the upper cutter bar be 12 inches below the roof. For such an arrangement the threads 62 may be formed at three threads per inch and the threads 56 formed at two threads per inch. Other variations of the retraction rates and of the final positions of the cutter bars would result from the obvious modifications of the thread pitch ratios.

While the invention has been described in terms of a preferred embodiment thereof its scope is intended to be limited only by the claims here appended.

I claim as my invention:

1. In a boring type miner, a pair of boring arms, upper and lower guides having cutting means thereon for removing the cusps remaining from the action of said boring arms, means for moving said guides toward and away from an operative position comprising internal and external mating screw members, each of said members being rotatably connected to its corresponding guide, a fixed internal screw member, screw threads on the exterior of the first named internal screw member mating with said fixed screw member, and means for rotatably driving the first named internal screw member in directions to cause correlative movement of said guides comprising a gear turning with said first named internal screw member, and a driving gear meshing with said gear.

2. In a boring type miner, a pair of boring arms, upper and lower guides having cutting means thereon for removing the cusps remaining from the action of said boring arms, means for moving said guides toward and away from an operative position comprising internal and external mating screw members, each of said members being rotatably connected to its corresponding guide, a fixed internal screw member, screw threads on the exterior of the first named internal screw member mating with said fixed screw member, and means for rotatably driving the first named internal screw member in directions to cause correlative movement of said guides.

No references cited.